United States Patent

[11] 3,542,275

| [72] | Inventors | Calvin D. Loyd<br>Peoria, Illinois;<br>Ramamurat R. Maurya, Philadelphia, Pennsylvania |
|------|-----------|---|
| [21] | Appl. No. | 720,758 |
| [22] | Filed | April 12, 1968 |
| [45] | Patented | Nov. 24, 1970 |
| [73] | Assignee | Caterpillar Tractor Co.<br>Peoria, Illinois<br>a corporation of California |

[54] RECIPROCATING FRICTION WELDER
9 Claims, 5 Drawing Figs.

[52] U.S. Cl. .................................................. 228/2,
29/470.3; 156/73
[51] Int. Cl. .................................................. B23k 27/00
[50] Field of Search .......................................... 228/2;
29/470.3; 156/73

[56] References Cited
UNITED STATES PATENTS
3,420,428  1/1969  Maurya et al. .................. 228/2

*Primary Examiner*—John F. Campbell
*Assistant Examiner*—Robert J. Craig
*Attorney*—Fryer, Tjensvold, Feix, Phillips & Lempio ABSTRACT: Friction welding apparatus, where one weld piece is to be reciprocated while in frictional engagement with another weld piece, including variable means associated with the reciprocable part and drive means coupled thereto to vary the amplitude of reciprocal motion of the part between a desired maximum and zero. Since the variable means provides for stopping the relative motion, precise alignment of the parts is permitted at the end of the weld cycle.

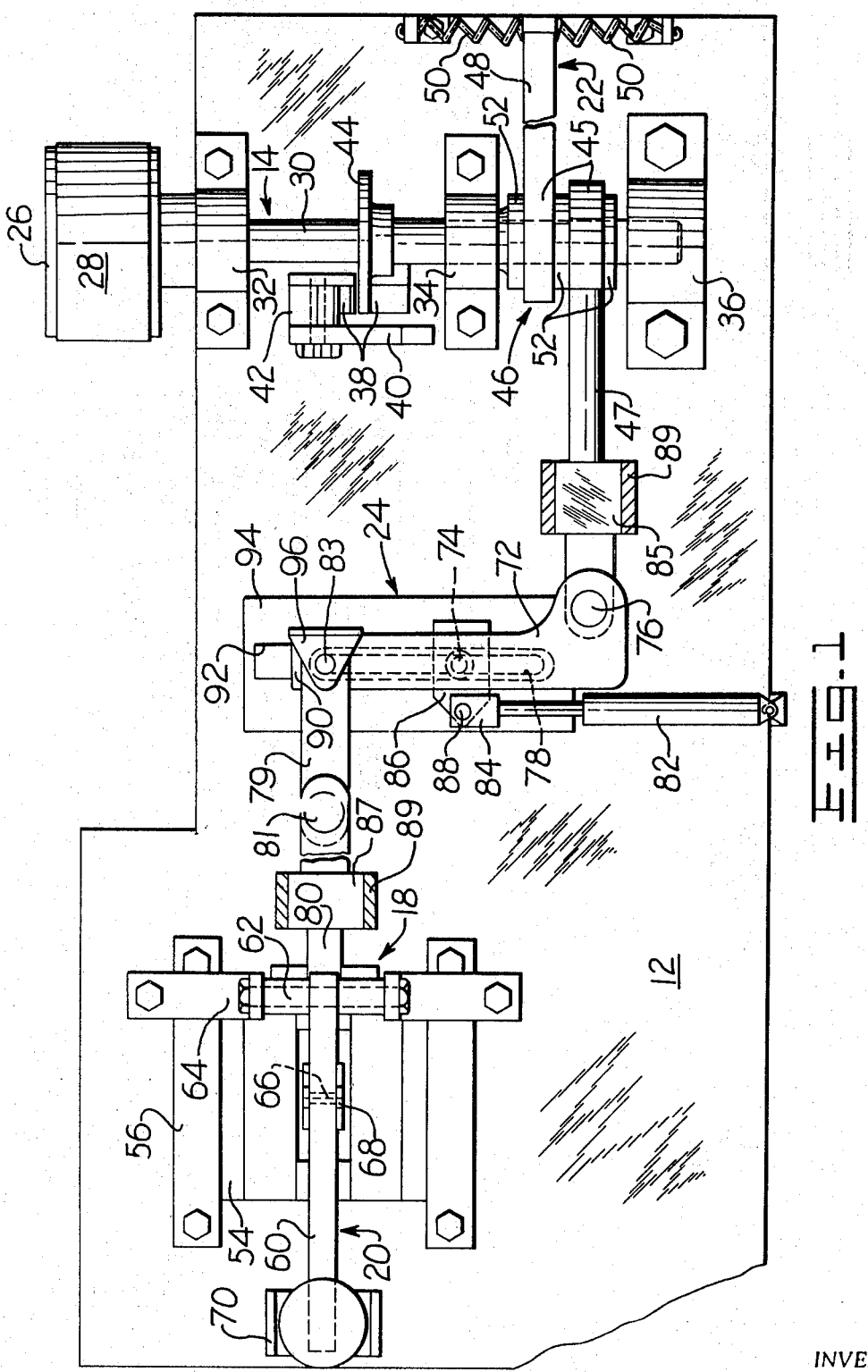

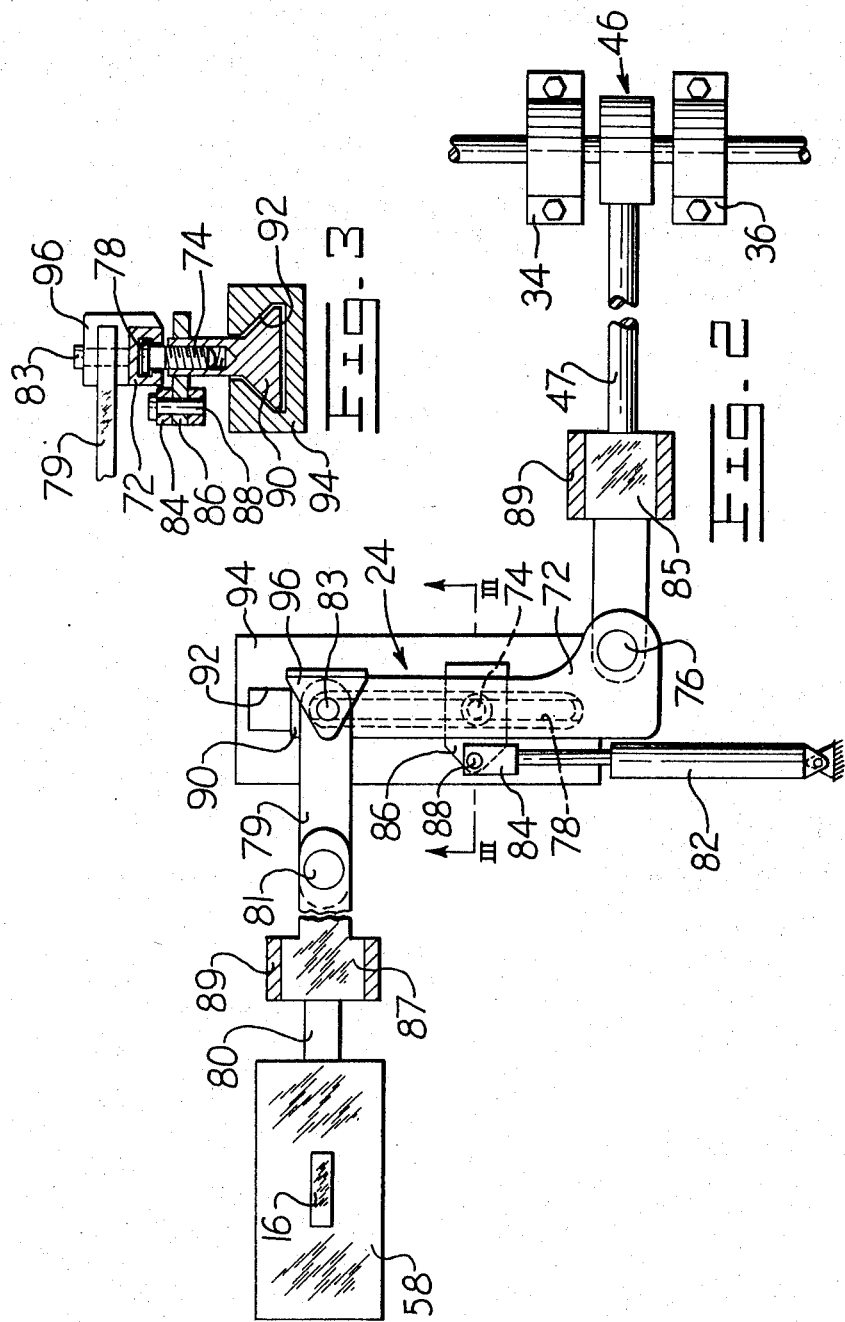

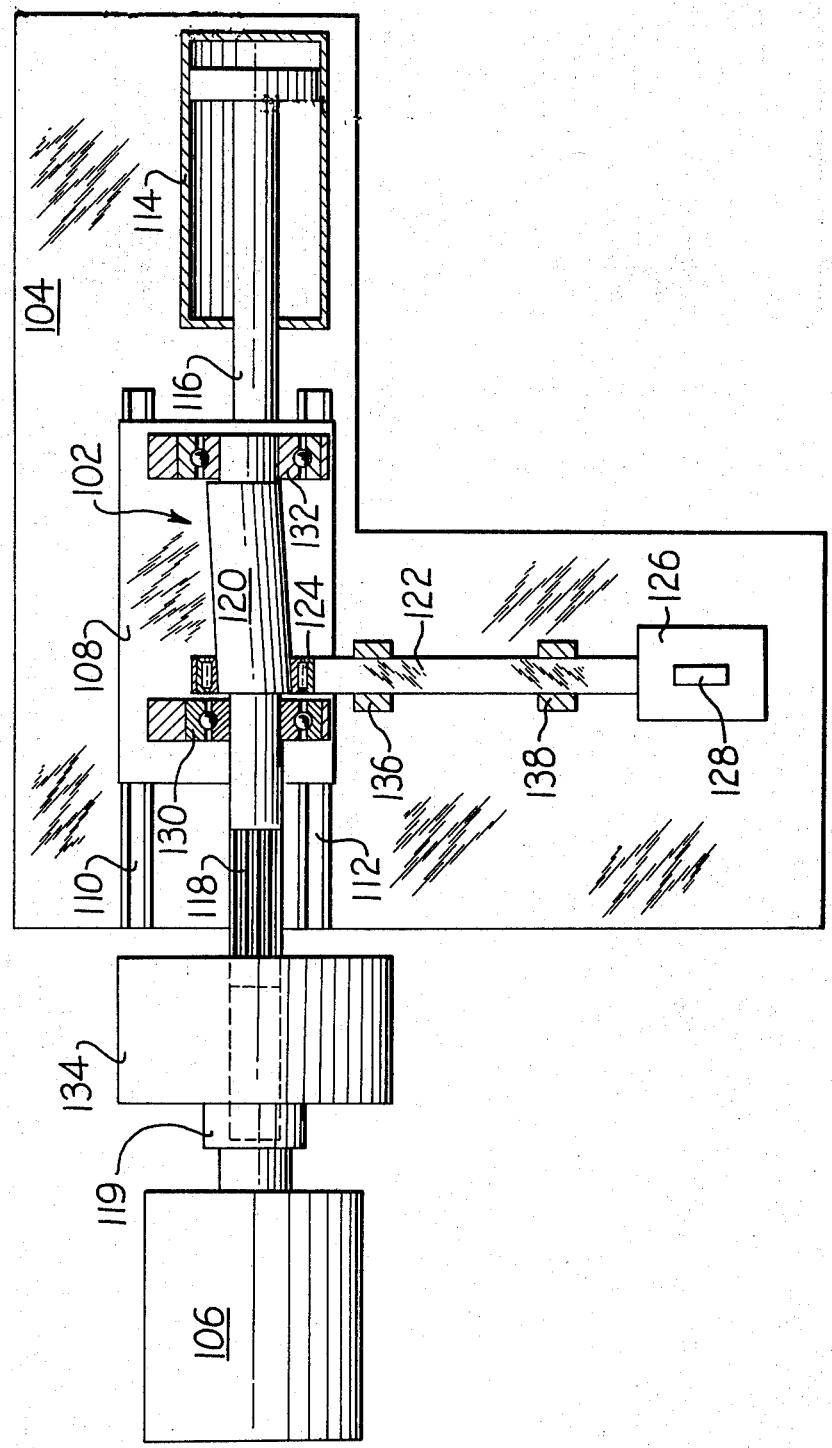

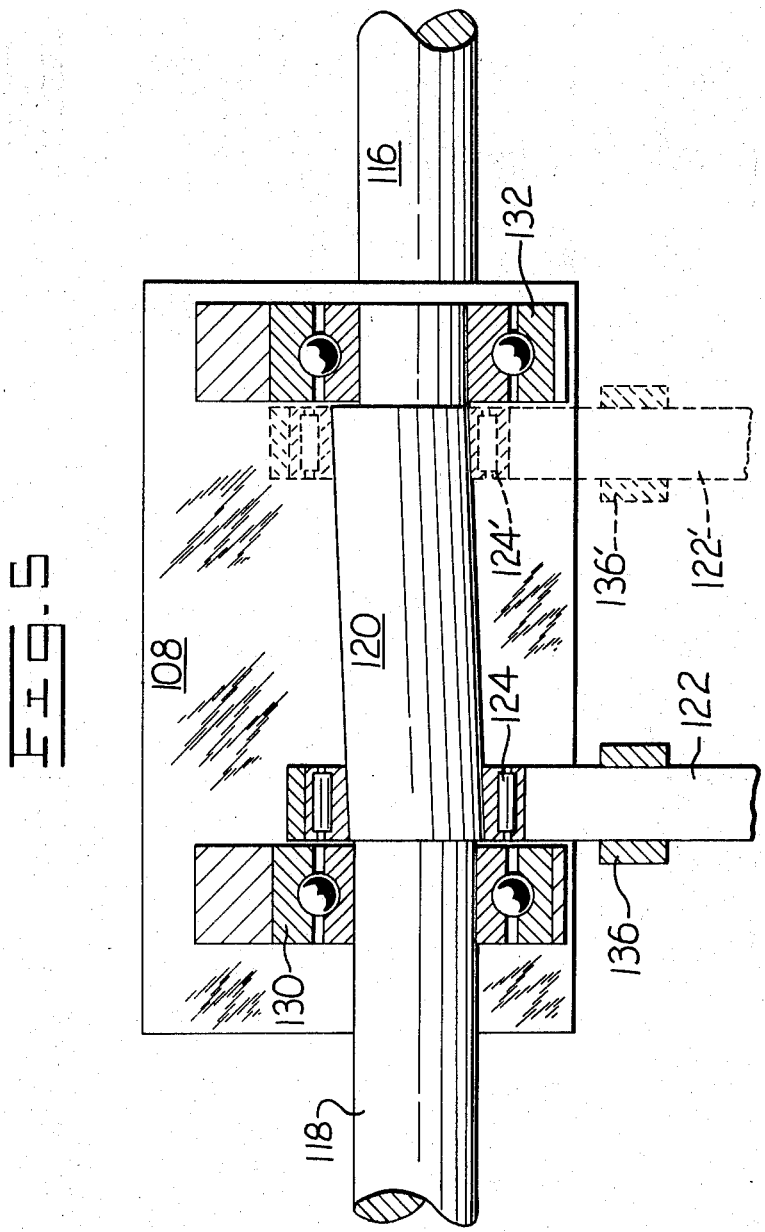

RECIPROCATING FRICTION WELDER

CROSS-REFERENCE TO RELATED U.S. PATENTS

The present invention is described with reference to friction welding apparatus and techniques generally similar to that described in U.S. Pat. application Ser. No. 499,249 entitled "Improvements In Bonding", filed Oct. 12, 1965 by Ramamurat R. Maurya, et al. now U.S. Pat. No. 3,420,428 assigned to the assignee of the present invention.

Two basic types of friction welding provide for either relative rotational or reciprocating motion of one of the weld pieces with respect to the other. There has been considerable development work with the rotational technique for joining weld pieces. However, that technique is particularly applicable to the joining of weld pieces which may be rotated with respect to each other with at least one of th weld pieces having a generally circular cross section at the weld interface.

On the other hand, the friction welding technique employing relative reciprocating motion between two weld pieces, as described in greater detail in the U.S. Pat. application referenced above, is readily adaptable for joining of weld pieces having a wide variety of shapes. However, there has been relatively limited use of the reciprocating technique, at least in part, because of the inability of prior art machines to precisely aline the weld pieces, for example, at the end of the welding cycle. The difficulty of providing for such precise alinement is readily apparent upon noting that one of the weld pieces is driven generally in alternating forward and reverse directions, for example, by a rod connected to a motor driven eccentric. When the weld pieces are heated to the welding temperature, reciprocating motion is stopped and upsetting pressure is applied to complete the weld. However, such prior art techniques have not provided for stopping rotation of the eccentric or reciprocating motion of the weld piece at a precise point. Therefore considerable variation in alinement of the weld pieces is encountered at the end of successive weld cycles.

The present invention provides means to position and align weld pieces in a reciprocating friction welder. In one embodiment, a variable displacement control link mechanism is pivotally supported by a movable fulcrum. The fulcrum is moved between selected positions to provide from zero to maximum amplitude of reciprocating motion. Thus, reciprocating amplitude can be reduced to zero at the end of the weld cycle to accurately aline the weld pieces being welded.

In another embodiment, rotatable, eccentric shaft or journal is supported on a sliding bearing block. A connecting rod is journaled at one end on the eccentric shaft and at the other end to a member which supports the reciprocating weld piece. The eccentricity of the rotatable, eccentric shaft varies from zero at one end to maximum eccentricity at the other end. Thus as the bearing block and eccentric shaft are moved relative to the connecting rod, the reciprocating motion of the weld piece may be reduced to zero to stop relative reciprocating motion and aline the weld pieces at the end of the weld cycle.

Accordingly, the invention provides means for varying the amplitude of motion or maximum displacement in a pair of relatively reciprocable weld pieces between zero and a selected value. Additional means regulate the displacement varying means and provide for accurate alinement of the weld pieces at least at the end of the weld cycle.

Thus, the invention permits a variety of welding speeds using only one motor as well as overcoming the problem of alining the weld pieces. This is accomplished by changing the displacement imparted to at least one reciprocating weld piece and thereby varying the amplitude of reciprocating motion during the same time interval.

FIG. 1 is a top view of a reciprocating friction welder including the present variable displacement link.

FIG. 2 is a top view of the variable displacement link mechanism of FIG. 1, further illustrating means for reciprocating one of the weld pieces.

FIG. 3 is a sectioned view taken along section line III–III of FIG. 2.

FIG. 4 is a top view illustrating an alternate embodiment of a reciprocating motion friction welder embodying a rotatable eccentric journal mechanism in accordance with the invention.

FIG. 5 is an enlarged top view of the rotatable eccentric journal mechanism of FIG. 4.

A reciprocating friction welder is illustrated in FIG. 1 as having a machine frame 12 upon which is mounted a drive mechanism 14 for providing reciprocating motion to a weld piece 16 (see FIG. 2). A holding fixture 18 secures a stationary weld piece (not shown) which is to be welded to the reciprocating weld piece 16. Loading means 20 are adapted to press the weld pieces together at their interface and balance means 22 dynamically balancing the reciprocating motion of the drive mechanism 14. The above components are generally constructed and operated in accordance with the above referenced patent application. The present invention further provides a variable displacement link mechanism 24 which is supported by the machine frame 12 and which transmits and controls reciprocating motion from the drive mechanism 14 to the reciprocating weld piece 16.

The drive mechanism comprises a motor (not shown) which is positioned in the machine frame 12 and is coupled to a pulley 26 via a belt 28. The pulley 26 is secured to a power shaft 30, which is supported for rotation on the frame 12 by means of a plurality of bearings 32, 34 and 36. Brake blocks 38 may be actuated by a lever 40 and a cam 42 to bear against a brake disc 44 and thus stop rotation of the shaft 30 at the end of a weld cycle.

The rotary motion of the motor and the shaft 30 is converted to reciprocating motion through an eccentric mechanism 46 which includes a pair of eccentric journals, generally indicated at 45. The journals are keyed to the shaft 30 between the bearings 34 and 36. A connecting rod 47 is coupled to one of the journals by means of an antifriction bearing (not shown) so that the rod 47 is caused to reciprocate by rotation of the shaft 30.

The balance means 22 includes a connecting arm 48 which is coupled to the other journal 45 by an antifriction bearing (not shown) and to the frame 12 by a pair of springs 50. The balance means 22 is adapted to dynamically balance the various moving parts of the link mechanism 24 and connecting rod 47. Spacers 52 maintain the axial alinement of the arm 48 and rod 47, and the related structure of the eccentric mechanism 46 on the shaft 30.

The holding fixture 18 includes a vertically movable block 54. A nonreciprocable weld piece (not shown) is secured to the bottom of the block 54. The fixture and its movable block 54 are secured to the frame 12 by means of a base 56 which is configured to receive a reciprocable block 58 (see FIG. 2) upon which the reciprocating weld piece 16 is secured.

The loading means 20 includes a lever 60 which is pivotally connected at 62 to a bracket 64, which in turn is rigidly connected to the machine frame 12. The lever 60 has a notch 66 which engages a ridged block 68 attached to the top surface of the block 54. As the lever 60 is pressed downwardly about the pivot 62, the vertically movable block 54 is pressed downwardly so that the nonreciprocable weld piece engages the reciprocating weld piece 16. Loading pressure is applied to the lever 60 by means of a selected weight 70.

The variable displacement link mechanism 24, as shown in FIGS. 1 and 2, includes a link member 72 which is pivotably supported by a fulcrum pin 74 and is coupled at one end to the connecting rod 47 by a pivot pin 76. A slot 78 in the link 72 allows the fulcrum pin 74 to be varied from a nearly in-line position with respect to the connecting rod 47 to a position directly in-line with a drive link 79 and a drive rod 80 connected thereto by a pin 81. The drive rod 80, in turn, is secured at its other end to the reciprocating block 58. The drive link 79 is connected to the link 72 by a pivot pin 83. Guides 85 and 87 are integrally formed with the connecting rod 47 and the drive rod 80 respectively and slide within respective conforming sleeves 89 to provide support and rigidity for the reciprocating rods during the welding operation.

Movement of the fulcrum pin 74 from one position to another along the slot 78 and corresponding variation of transmitted reciprocating motion is accomplished, for example, by an air or hydraulic cylinder 82 having its rod connected to a yoke member 84. The yoke member is pivotally secured at 88 to a plate 86 associated with the link 72. Referring in addition to FIG. 3, fulcrum pin 74 is threadably secured to a guide bar 90 which travels in a machined way 92 of a rail 94.

To permit termination of reciprocable motion of the drive link 79 without interrupting operation of the drive mechanism 14, an offset bracket 96 is secured to the link 72 and is pivotally connected to the drive link 79 by the pin 83. The pin 83 is thus positioned along the axis of the drive link 79 and in coaxial alinement with the fulcrum pin 74 upon full extension of the cylinder 82. Thus the link member 72 can pivot about pins 83 and 74 without imparting any reciprocating motion to the drive rod 80 and block 58 to terminate reciprocation of the weld piece 16.

In operation, motion is imparted to the weld piece 16 by rotation of the power shaft 30 with the eccentric mechanism 46 providing for reciprocating motion of the connecting rod 47. As the connecting rod 47 reciprocates, the link 72 oscillates about the fulcrum pin 74 and causes the drive rod 80 and weld piece 16 to reciprocate when the fulcrum pin 74 is out of alinement with the pin 83. With the fulcrum pin 74 at the end of the slot 73 nearest to connecting rod 47, reciprocatory motion and speed of the reciprocating weld piece 16 are at a maximum. As the fulcrum pin 74 is moved by extension of the cylinder 82, reciprocatory motion and speed of the weld piece 16 are decreased and are completely terminated when the fulcrum pin 74 is in coaxial alinement with the pivot pin 83. The friction welder components are designed so that, with the fulcrum pin 74 in alinement with the pin 83, the weld pieces are accurately alined, for example at completion of a weld cycle. Even though motion of the weld piece 16 is stopped, motor rotation and motion of the power shaft 30, eccentric mechanism 46, connecting rod 47 and the link member 72 may continue without effecting the relative position of the weld pieces. To further facilitate operation of the welding machine, operation of the cylinder 82 to aline the fulcrum pin 74 may be linked for example to operation of the loading means 20.

An alternate embodiment of the invention is illustrated in FIGS. 4 and 5. Different means 102 are employed to provide for variable displacement, variable speed, and alinement of the weld pieces at the end of the weld cycle. The alternate embodiment of the friction welder has a welder frame 104 with a motor 106 secured thereto. A slidable bearing block 108 is mounted on guide rails 110 and 112 which are fastened in turn to the frame 104. The bearing block 108 is positioned between the motor 106 and an air or hydraulic cylinder 114 and is coupled to the cylinder rod 116. A power shaft 118 couples the motor 106 to an eccentric shaft or journal 120, which is mounted for rotation on the slidable bearing block 108. An extensible coupling 119 between the motor and power shaft 118 provides a continuous driving connection when the journal 120 and shaft 118 are repositioned by the slidable block 108. The journal 120 and shaft 118 provide for variable displacement and speed as well as providing the function of driving eccentricity accomplished by the eccentric mechanism 46 of FIGS. 1-3.

One end of a connecting rod 122 is operatively coupled to the eccentric journal 120 by a bearing 124 while its other end is connected to a reciprocable block 126 on which a weld piece 128 is secured. The end of the power shaft 118 which is coupled to the eccentric journal 120 is supported by a bearing 130 and its other end is supported by a bearing 132. An optional flywheel 134 may be secured to the power shaft 118 to provide additional inertia or power for driving the reciprocable weld piece 128 during the welding cycle. Guides 136 and 138 are disposed along the connecting rod 122 to provide support and rigidity to the rod during the welding cycle.

The means 102 for providing variable displacement, speed and weld piece alinement is shown in greater detail in FIG. 5. Rotary motion is supplied by the motor 106 (see FIG. 4) to the power shaft 118 and the eccentric journal 120. With the bearing block 108 and connecting rod 122 in their relative positions shown by solid lines in FIG. 5, no reciprocating motion is supplied to the connecting rod 122 since the left end of the journal 120 is concentric with the power shaft 118. Accordingly, there is no reciprocation of the weld piece 128. As the bearing block 108 is moved leftwardly by extension of the pressure cylinder 114 (see FIG. 4), increasing reciprocable motion is introduced to the connecting rod 122 since the right end of the journal 120 is increasingly eccentric with respect to the axis of the power shaft 118. The reciprocating motion of the connecting rod 122 is at a maximum when the bearing block 108 is moved completely to the left. For purposes of clarity, that position of the block is illustrated by repositioning of the bearing 124, connecting rod 122 and guide 136 to their broken line positions referenced by primed numerals. However, it is to be particularly noted that in actual operation, the connecting rod 122 is held stationary on the frame 104 while the bearing block 108 and eccentric journal 120 are shifted by the cylinder 114. The connecting rod 122 does experience reciprocating motion along its length.

The welding apparatus is so arranged that with the slidable bearing block 108 in its rightward position shown by solid lines, the two weld pieces are in accurate alinement for joining. A weld cycle would begin therefore, with the bearing block 108 at least partially shifted to the left so that some reciprocating motion is transmitted to the weld piece 128. When friction between the stationary weld piece and the reciprocating weld piece heats their interface to a suitable welding temperature, the block 108 is moved by the cylinder 114 to its rightwardmost position where reciprocating motion ceases. At this time, with the weld pieces in perfect alinement and experiencing no relative reciprocating motion, axial loading is applied between the weld pieces as in conventional practice. Since the connecting rod is experiencing no eccentric drive in this position, the power shaft 118 and the eccentric journal 120 may continue to rotate during the final welding stage without affecting alinement of the joined weld pieces.

It is readily apparent that reciprocating speed of the weld piece 128 varies in response to displacement of the block 108 or the degree of eccentric drive experienced by the connecting rod 122. Accordingly, the variable eccentric drive function of the present invention may also be employed to optimize the initial relative reciprocating motion between the weld pieces. For example, by slowly moving the bearing block 108 leftwardly during the weld cycle, the amplitude of the reciprocating motion may be decreased gradually during the entire weld operation. If it is desired to maintain a constant amplitude and then accurately aline the weld pieces at the end of the weld cycle, the bearing block is rapidly shifted to its rightwardmost position just prior to or at least generally simultaneously with the application of axial upsetting pressure at completion of a weld cycle.

Thus, the two embodiments of the present invention each provide mechanically simple and reliably effective means for selectively varying the displacement and speed of the reciprocable weld piece.

We claim:

1. In a reciprocatory friction welder having a power source for providing relative reciprocable motion in a pair of weld pieces by repeated relative displacement of the weld pieces and a reciprocable holding member driven by the power source for holding and reciprocably moving one of the weld pieces relative to the other, the improvement comprising:

a variable displacement mechanism operatively coupled between the power source and the reciprocable holding member, said mechanism being operable to infinitely vary maximum reciprocable displacement of the holding member and the one weld piece relative to the other weld piece between zero and a predetermined value; and means for selectively regulating said variable displacement mechanism to provide a selected value of said maximum reciprocable displacement, said regulating means being adjustable to condition said variable displacement mechanism for maximum reciprocable displacement between the weld pieces of zero and to simultaneously aline the weld pieces in a selected relation.

2. The apparatus of claim 1 wherein said variable displacement mechanism comprises a variable displacement link having a movable fulcrum pin and said regulating means are operable to move said fulcrum pin between a position corresponding to zero displacement and another position corresponding to said predetermined value of maximum displacement between the weld pieces.

3. The apparatus of claim 2 further comprising, connecting rod means operatively coupled to said power source and adapted to reciprocate in response thereto, a variable link member pivotally supported by said movable fulcrum pin and coupled at one end to the connecting rod means, and drive rod means coupled at one end to said block means and at its other end to said variable link member said drive rod means to selectively reciprocate said block means in response to pivoted movement of the link member about the fulcrum pin.

4. The apparatus of claim 3 further comprising support means to slidably support said fulcrum pin, motor means coupled to said fulcrum pin to adjust its position along said variable link member, said link member having a slot formed therein to slidably engage said fulcrum pin so that selective actuation of the motor means varies the position of the fulcrum pin within the slot and along the link member to correspondingly determine said maximum displacement between the weld pieces.

5. The apparatus of claim 4 wherein said variable link member is disposed in generally perpendicular relation to the connecting rod means and the drive rod means at its respective opposite ends, wherein said slot extends within the link member from a point almost in-line with the connecting rod means to a point which lies directly in-line with the drive rod means so that movement of the fulcrum pin within the slot to the position in-line with the drive rod means provides for said zero displacement of the reciprocable weld piece relative to the other weld piece.

6. The apparatus of claim 1 wherein said variable displacement mechanism comprises means having a variable eccentricity and a slidable bearing block for establishing eccentricity of the variable eccentricity means, said means for selectively varying displacement including means for moving the slidable bearing block between positions corresponding to the selectable displacement of zero and said predetermined value of maximum reciprocable displacement between the weld pieces.

7. The apparatus of claim 6 further comprising a power shaft operatively coupled to said power source and adapted to rotate in response thereto, an eccentric journal supported in rotatable relation on said slidable bearing block means and coupled at one end to the power shaft means, a drive rod coupled at one end to said weld piece block means and slidably coupled at the other end thereof to said eccentric journal for selective reciprocation in response to rotation of the eccentric journal.

8. The apparatus of claim 7 further comprising support means to slidably support said bearing block and motor means coupled to said bearing block wherein selective actuation of the motor means varies the position of the bearing block and thus of the eccentric journal relative to the drive rod to correspondingly establish said variable reciprocable displacement.

9. The apparatus of claim 8 wherein said slidable bearing block moves perpendicularly to the drive rod, the drive rod includes bearing means coupled to the eccentric journal, said power shaft includes means for permitting axial displacement of the power shaft relative to the power source, the eccentric journal providing zero eccentricity with the drive rod positioned at one end thereof and predetermined eccentricity with the drive rod positioned at its other end, wherein movement of the eccentric journal relative to said drive rod to position the latter at the point of zero eccentricity provides for zero displacement and desired alinement of the reciprocable weld piece relative to the other weld piece.